Sept. 11, 1962    J. RÖDER ET AL    3,053,379
MATERIAL HANDLING VIBRATING MACHINE
Filed June 20, 1957    7 Sheets-Sheet 1

Inventors.
Josef Röder, &
Fritz Stoff.
By
Atty

Sept. 11, 1962 J. RÖDER ET AL 3,053,379
MATERIAL HANDLING VIBRATING MACHINE
Filed June 20, 1957 7 Sheets-Sheet 4

Inventors.
Josef Röder, &
Fritz Stoff.
By
Atty.

Inventors.
Josef Röder, &
Fritz Stoff.

By 
Atty.

Sept. 11, 1962  J. RÖDER ET AL  3,053,379
MATERIAL HANDLING VIBRATING MACHINE
Filed June 20, 1957  7 Sheets-Sheet 6

Inventors.
Josef Röder &
Fritz Stoff
By
Atty.

FIG. 10

United States Patent Office 3,053,379
Patented Sept. 11, 1962

3,053,379
MATERIAL HANDLING VIBRATING MACHINE
Josef Röder and Fritz Stoff, Darmstadt, Germany, assignors to Carl Schenck Maschinenfabrik G.m.b.H., Darmstadt, Germany, a corporation of Germany
Filed June 20, 1957, Ser. No. 666,980
Claims priority, application Germany June 21, 1956
8 Claims. (Cl. 198—220)

This invention relates to vibrating or oscillating machines.

It is known to excite machines which are mounted so as to be capable of oscillating, for example, shaking conveyors or screens, so as to perform unidirectional oscillations. Unidirectional oscillations are those which run linearly in one plane. In order to produce such oscillations use is preferably made either of known electromagnetic exciters or unbalanced masses, which are disposed on shafts and are positively coupled by gear means in such a manner that they rotate at the same speed but in opposite directions to one another and in this way form a centrifugal unidirectional exciter.

In order to excite compacting so as to perform oscillations, it has been proposed to dispose two non-coupled unbalances or centrifugal exciters horizontally side by side on shafts rotatably mounted on a relatively rigid vibrator, which is mounted so as to be capable of oscillation, and to rotate them in opposite directions, because it has been found that the co-oscillating centrifugal exciters automatically synchronise even without a coupling and thus excite the machine unidirectionally.

Based on this fact, the object of the present invention is to provide new possibilities of operating vibrating conveyors and screening machines more advantageously than in the past and of carrying out processes for which there were hitherto either no suitable machines at all or only machines entailing complicated operations. This object is realized with the aid of one or more non-coupled or independently operating unbalanced weight vibrators, broadly referred to as centrifugal exciters which, by virtue of their simplicity, are less expensive and, owing to their sturdiness, require less maintenance but which, in respect of their excitation power, can also be satisfactorily regulated. The invention is of particular advantage for chemotechnical processes.

It has been found that, for the purpose of obtaining conveying power on an oscillating machine with non-coupled or independently operated centrifugal exciters, the latter must produce accelerations having tangential components so as to provide synchronization of the rotating masses at each instant of rotation. The phase position of the two unbalanced elements in the state of stable rotation is dependent upon the magnitude and the direction of the acceleration and also upon the direction of rotation of the acceleration vector. Apart from normal conveying or screening, a number of characteristic and technically usable oscillatory movements can also be derived therefrom, by means of which a large number of industrially important problems can be solved in a surprisingly simple and inexpensive manner. The reciprocating conveying of loose material on a conveying or screening device and the quantitatively regulated feeding of such materials may be cited purely as examples.

A characteristic feature of the present invention resides in the application of oscillating machines of the kind above indicated, as oscillating conveyors or oscillating conveying screens, by ensuring that the oscillatory motion required to produce the desired mode of operation of the machine is obtained either by the arrangement of the centrifugal exciters or by different power supplies to the driving means of the centrifugal exciters or by different directions of rotation of the centrifugal exciters or by a combination of all or some of these measures. The oscillatory motions of this kind may be linear, elliptical or circular, and identical or different at any point of the oscillating machine; in the case of an elliptical or circular motion, the rotation of the oscillatory motions may be clockwise or counterclockwise. In the case of linear excitation, the resultant of the centrifugal unidirectional excitation produced without a coupling is to extend approximately through the total centre of gravity of the machine mass and of approximately half the quantity of material to be conveyed or screened normally constituting the load thereon, because this mode of operation has proved particularly advantageous and also that the unidirectional excitation produced without a coupling automatically tends towards the total centre of gravity.

In order to enable the invention to be more readily understood, reference is made to the accompanying drawings which illustrate diagrammatically and by way of example, various embodiments thereof.

A. *Application of the invention to freely oscillating machines with a linear oscillatory motion in one plane*

Figures 1A, 1B, 2:
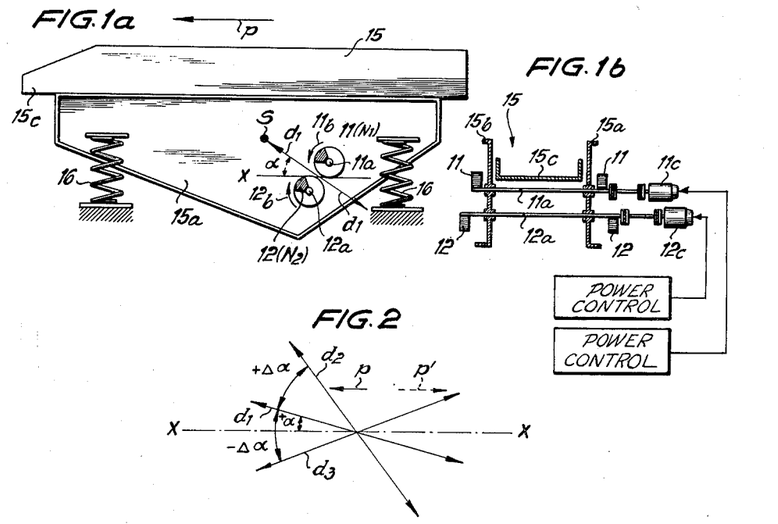
FIGS. 1a and 1b show the invention, applied to freely oscillating machines with linear oscillating motion.
FIG. 2 shows the operation.

A machine 15 disposed to oscillate freely, i.e., not guided by constraint by means of guide springs or the like, and serving for conveying and/or screening, is driven by means of two unbalanced vibrators 11 and 12 (centrifugal exciters), which are completely independent of one another and have their own driving motors 11c and 12c respectively, FIGURES 1a, 1b and 2.

*1. Data*

(1) Both driving motors 11c and 12c are of the same power and can therefore normally deliver the same power ($N_1=N_2$) to the oscillation exciters 11 and 12.

(2) The oscillation exciters rotate in opposite directions (arrows 11b and 12b).

*Result*

In consequence of the dynamic force conditions in the total system, which comprises the excited mass of the machine 15, the exciting unbalanced masses 11 and 12, and the material to be conveyed or screened on the machine, the rotating unbalancing effects of the uncoupled centrifugal vibrators come into unidirectional synchronous rotation, with the result that in this state the components of the centrifugal forces in the direction of the line connecting the exciter shafts cancel one another out and are added together in the direction $d_1$ vertical to the connecting line.

Figure 4:
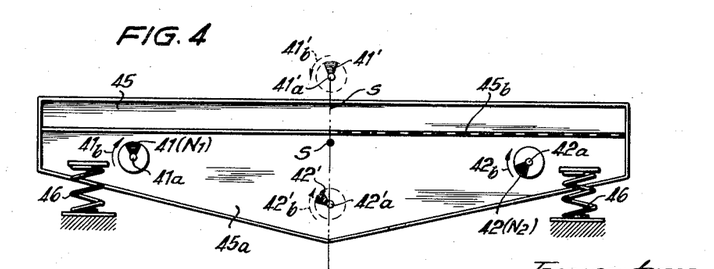
Figure 5A:
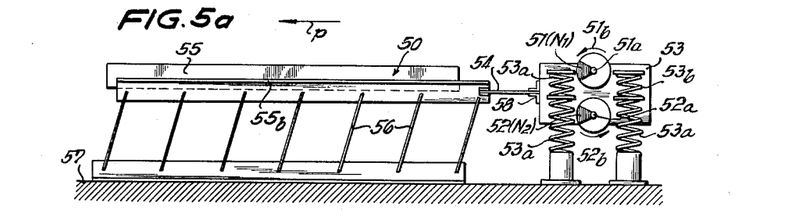
FIGS. 5a to 5d illustrate examples of the invention, applied to reciprocating conveyors.
Figure 5B:
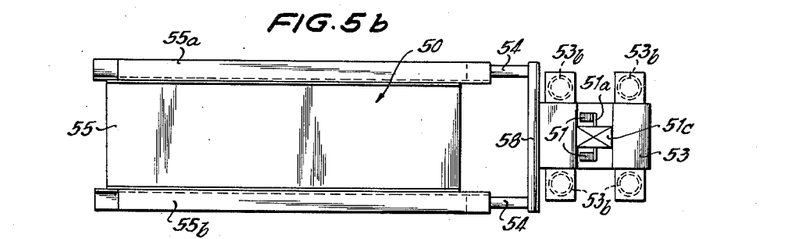
Figure 5C:
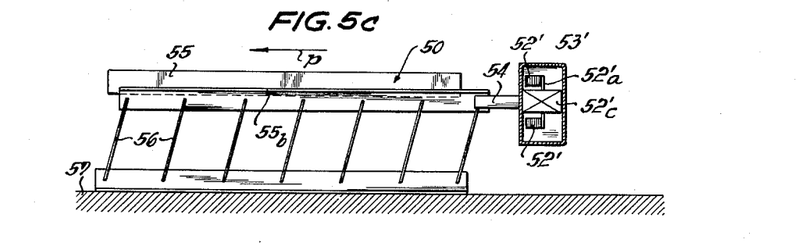
Figure 5D:
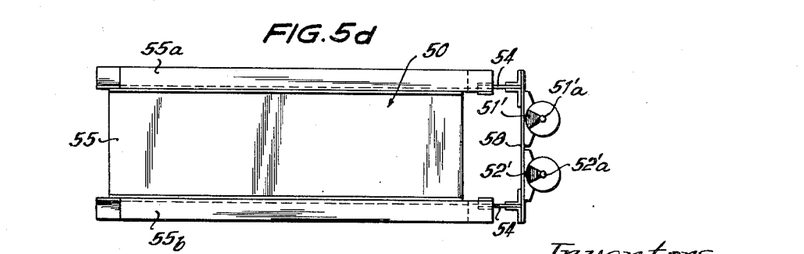

The centrifugal oscillation exciters 11 and 12 may be disposed at any desired point on the oscillating machine 15; FIG. 1b shows a usual arrangement nearer the end of the side walls 15a, 15b carrying the trough 15c where the material is fed. The unbalances 11 and 12 secured to the shafts 11a and 12a respectively are each separately driven by a motor 11c and 12c respectively, these motors having the powers $N_1=N_2$. The angle (angle of incidence $\alpha$) for the direction $d_1$ of the excitation force produced by the rotating unbalances to the axis X, parallel to the longitudinal axis of the machine, in the conveying direction (arrow $p$) is as a rule between 15° and 25° when operating purely for conveyance, while for screening a somewhat greater angle of incidence α may be advantageous. The direction $d_1$ of the excitation force will preferably extend through the centre of gravity S of the oscillating machine including approximately half the quantity of material to be conveyed or screened normally constituting the load on said machine. The machine 15 is supported on a foundation so as to be freely capable of oscillation by means of coil springs 16. The unbalanced masses are so driven that they rotate in opposite directions to one another (arrows 11b, 12b). They immediately synchronise automatically, and then produce the required directed excitation force $d_1$ through the total centre of gravity S. Instead of being disposed underneath at the trough charging end, the exciters 1 and 2 may also be disposed nearer the trough delivery end both above, or approximately in the middle of the trough one above, the other beneath (cp. FIG. 4) the trough 15b.

For the reversal of the direction of conveyance p on the machine 15, it is necessary to change the angle of incidence α. This requirement may be satisfied by turning the direction of excitation $d_1$ to the direction $d_3$ (cp. FIG. 2), namely by regulating the driving powers from $N_1=N_2$ to $N_1\neq N_2$, this being dealt with under II.

II. Data (1) The two driving motors 11c and 12c deliver different powers ($N_1\neq N_2$) to the oscillation exciters.

(2) The oscillation exciters 11 and 12 rotate in opposite directions (arrows 11b and 12b), as in FIG. 1.

Result a. The exciter receiving the lower power rotates synchronously, but with a phase shift lagging with respect to the exciter receiving the higher power. In consequence, the direction of the resultant excitation force varies, in accordance with vectorial addition. Consequently, by appropriate regulation of the supply of power to the exciters it is possible to achieve simple and accurate regulation of the speed of conveyance on the oscillating machine. For batching purposes this possibility is of particular interest and advantage. Occasionally it may be useful to stop one exciter completely, whereby during the final phase of a batching process, for example in distributing the material to filling weighing machines, an undirected excitation is used.

On shaking tables which are equipped with uncoupled centrifugal exciters in the horizontal plane for vertical directed excitation (with $N_1=N_2$), it is possible to obtain conveying as well as shaking by regulating $N_1=N_2$ to $N_1\neq N_2$.

The diagrammatic illustration in FIG. 2 shows the operations described. With the driving power $N_1=N_2$ the angle of incidence has the value α and the excitation resultant the direction $d_1$. When $N_1$ has become unequal to $N_2$ by regulation, the angle of incidence changes.

b. If it is desired primarily to convey in opposite directions alternately, it is advisable to dispose one exciter 41' (FIG. 4) above, and the other exciter 42' beneath the trough or screening floor 45b, in such a manner that the unbalance shafts 41'a and 42'a lie on a centroidal axis s of the entire machine 45 which is perpendicular to the screening or conveying floor 45b. The material is conveyed back and forth on the oscillating machine. If the conditions $N_1\neq N_2$ are allowed to remain and the direction or rotation of the two exciters is reversed at predetermined intervals of time, then material is likewise conveyed back and forth on the machine. FIG. 2 also illustrates this process.

c. All these novel modes of drive are very valuable for the performance of chemotechnical processes. For batching purposes in particular, it is possible to add to the basic exciters for normal material conveying one or more detuned exciters, the excitation power of which reduces the conveying power.

III. Data (1) Both driving motors deliver different powers ($N_1\neq N_2$) to the oscillation exciters 11 and 12.

(2) The exciters rotate in the same direction.

Result

Considering the case $N_1=N_2$ first, then depending upon the arrangement of the exciters with respect to the total centre of gravity of the machine including approximately half the amount of material normally disposed thereon, the oscillating machine remains at rest or approximately at rest when the centres of rotation 31a, 32a (FIG. 3) of the unbalance masses and the total centre of gravity S lie close to one another on one and the same straight line as far as possible. The centres of rotation should also have the same distance from the centre of gravity. During operation the unbalanced masses automatically adjust themselves so that they rotate with a phase shift of 180°. The centrifugal forces produced by them thus cancel one another out; a pulsating moment remains, of the maximum value "centrifugal force" times "distance between the exciters."

If, however, the driving power is $N_1\neq N_2$, then the mutual phase shift of the rotating unbalanced masses is 180°±angular degrees. This gives the possibility of changing the oscillation amplitudes by electrical or mechanical brake regulation of the exciters without changing the mass of the rotating unbalance.

The oscillation exciters are preferably symmetrically arranged near the total centre of gravity of the oscillating machine.

Figure 3:
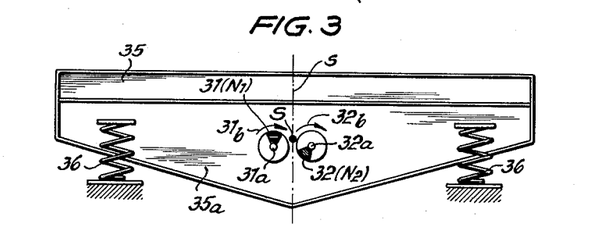
FIGS. 3 and 4 show various arrangements of unbalanced weight vibrators.

FIG. 3 shows an arrangement of centrifugal exciters 31, 32 near the centroidal axis s for the purpose of producing circular or elliptical oscillatory movements, such as may be desired for example for oscillating machines having a screening device. The unbalance masses of the centrifugal exciters 31 and 32 rotate in the same directions (arrows 31b, 32b), but with a phase shift. The machine 35 is supported so as to be capable of oscillating freely on coil springs 36. During operating, the two oscillation exciters synchronise automatically.

FIG. 4 shows the symmetrical arrangement of the two centrifugal exciters 41 and 42, shown in full lines, relative to the vertical centroidal axis s of the machine at approximately a maximum distance in a horizontal direction from the total centre of gravity S of the oscillating machine 45 supported on the coil springs 46.

The characteristic oscillatory movement of the machine is formed by the superimposition of a circular oscillation entailed by the rotating differential force of the two individual excitation forces, with a rotary oscillation about the total centre of gravity S, entailed by the moments acting at any given time (centrifugal force times distance from total centre of gravity). In this way are produced elliptical oscillations which impart movement impulses to the material.

B. Application of the principle of the invention to reciprocating conveyor machines Reciprocating conveyors are oscillating conveyor machines which work on the so-called "micro"-throw principle with small amplitudes (about 2 to 5 mm.) but a high frequency (about 1000 to 1500 oscillations per minute).

In the embodiments illustrated in FIGS. 5a to 5d (elevations with appertaining ground plans), the vibration of the machines 50 is excited by two uncoupled centrifugal exciters 51 and 52, which are mounted on a common support 53, which in turn is mounted to be freely oscillatable, and are connected by an articulated rod 54 or the like to the reciprocating conveyor machine 50 which is guided by constraint on spring links 56. The shafts 51a and 52a, on which the unbalanced discs of the vibration exciters 51 and 52 are keyed, lie parallel to and vertically over one another. The support 53 itself is carried elastically by four springs 53a, preferably supplemented by stabilizing counter-stressed springs 53b. The connecting element or elements 54 can be leaf springs. The unbalanced masses of the exciters 51 and 52 should rotate in opposite directions. Two driving motors 51c, only one of which will show in FIG. 5b, which are independent of one another, have equal power, and give a total power of N, are provided for the exciters.

The exciters synchronise automatically in operation and impart to the oscillating machine 50 unidirectional conveying excitation of a determined amplitude. Given identical direction of rotation (arrows 51b, 52b) of the exciters 51 and 52, but the supply of different powers to the driving motors of the unbalance exciters, i.e., $N_1$ not equal to $N_2$, the support 53 performs circular or similar oscillatory movements. Since the oscillating machine 50 works like the machine according to FIG. 3, reference may be made to the description thereof, Section A, paragraph III, a. Connection of the reciprocating conveyor 50 to the support 53 is here advantageously effected approximately level with the centre of gravity by means of a yoke 58, which couples two connecting elements, for example leaf springs 54, which act on the longitudinal members 55a and 55b of the reciprocating conveyor trough 55. A construction of this kind enables the amplitudes of the reciprocating conveyor trough to be varied in simple manner by regulating the supply of power to the exciters.

When the exciters 51', 52' are disposed with vertical axes 51'a, 52'a (FIGS. 5c and 5d) in the support 53', then it is possible to dispense with the carrying springs for mounting the support 53', if the connecting elements 54 are instead capable of taking the dead weight of the exciters.

These constructions have the following advantages (1) No gear is required for synchronising the two exciters; (2) Only a small fraction of the excitation force produced is transmitted to the foundation 57 of the oscillating machine; (3) In the case of reciprocating conveyors suspended so as to be vibrationally insulated and supported by means of guide springs or the like on a countermass, such a countermass is no longer required for the exciter; and (4) A plurality of oscillating conveyor machines with or without a screening device may be connected to the exciter, while both the direction of conveying and the angle of throw of the particles of material may be appropriately selected by the particular inclination selected for the machine guide springs 56.

C. *Application of the principle of the invention to oscillating machines which, as circular ring or spiral reciprocating conveyors substantially symmetrical with respect to rotation, are built to be constraint-guided on guide springs or freely oscillatable on coil springs*

FIGS. 6a–6c, 7a–7b, 8a–8d, 9 and 10 give examples.

It has been found that the drive of such machines, especially for use in large plants where high conveying powers are required, is best effected by a plurality of directed exciters in such manner that in the individual exciters the unbalances by constrained coupling produce a directed excitation on rotation and an even number, for example two or four, of such centrifugal directional exciters are provided according to the invention without any mutual coupling.

Each individual directional exciter is driven separately by a motor independently of the other directional exciters that may be provided on the oscillating machine. All the directional exciters automatically synchronise in operation and produce a joint directional excitation of the machine.

Figure 6A:
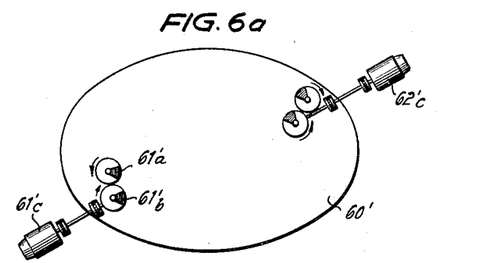
FIGS. 6a–6c, 7a—7b, 8a–8d, 9a—9b and 10 give examples of the application of the invention to circular ring or spiral reciprocating conveyors.

FIG. 6a shows a diagram for the oscillation excitation of a freely oscillating reciprocating conveyor having a material conveying track of the shape of a circular ring or spiral or helix. 60' is the plan view contour of such a conveyor, on which there are disposed according to the invention approximately diametrically opposite one another the coupled directional exciters each comprising a pair of unbalances 61'a, 61'b and 62'a, 62'b respectively. Each exciter pair is driven individually by a motor 61'c and 62'c respectively. The unbalance masses 61'a and 61'b rotate synchronously in opposite directions, and so do the masses 62'a and 62'b. The two directional exciters synchronise in operation without a coupling.

Figure 6B:
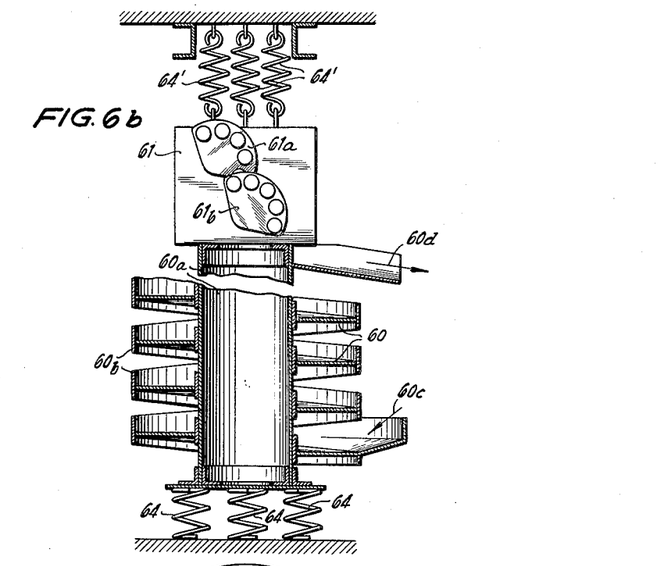
Figure 6C:
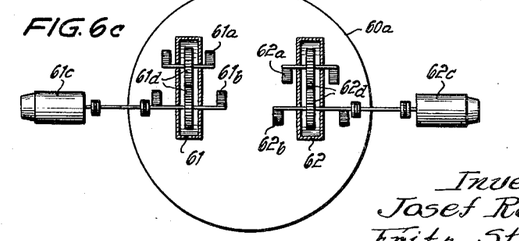

FIGS. 6b and 6c (elevation and plan view) show a practical embodiment for the type of excitation illustrated in the diagram. 60 is a so-called spiral reciprocaitng conveyor, which comprises the tubular middle part 60a with the material conveying chute 60b riveted or welded on in the form of a spiral. When the conveyor is to be used primarily for the upward conveyance of loose material and the like, the material is charged at the bottom at the arrow 60c. The conveyor either rests at the bottom on a number of coil springs 64, for example three, or hangs at the top together with the exciter box 61 from coil springs 64', or it is spring supported at each end. Those versed in the art will see that this is a case of a freely oscillating support of the conveyor. The springs 64 themselves are held by girder, foundation or ceiling constructions. The ground plan according to FIG. 6c shows the installation (without the spiral) turned through 90°. The sectionally indicated housings 61 and 62 of the centrifugal directional exciters 61a, 61b and 62a, 62b each show a gear wheel coupling 61d and 62d respectively. 61c and 62c are the driving motors.

Figure 7A:
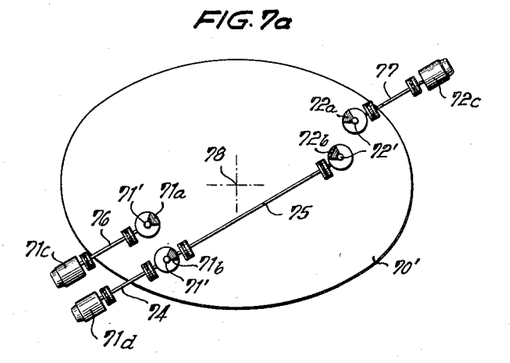
Figure 7B:
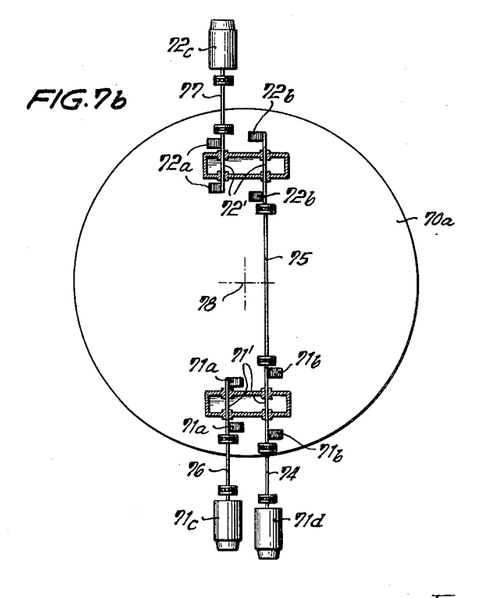

Another drive for such oscillating machines by means of an even number of oscillation exciters is shown in FIGS. 7a and 7b.

FIG. 7a is a diagram similar to FIG. 6a and FIG. 7b a plan view similar to FIG. 6c. The unbalanced masses 71a, 71b and 72a, 72b are mounted on shafts 71' and 72' respectively, which are at least approximately parallel to one another. Synchronous running of all the exciters can be achieved without a synchronising gear if two of the exciters provided are disposed opposite one another approximately diametrically at the periphery 70' or 70a of the oscillating machine, and are forced into synchronous rotation with one another by means of a coupling member. Thus for example the unbalanced masses 71b and 72b are connected together by the cardan shaft 75 and are jointly driven by the motor 71d through a cardan shaft 74. The unbalanced masses 71a and 72a are each driven individually by motors 71c and 72c respectively through cardan shafts 76 and 77 respectively, namely in the opposite direction to the unbalanced masses 71b and 72b. The driving power for the jointly driven unbalanced masses 71b and 72b shall be assumed to be ½N of the total power N required to drive the system.

Assuming the powers of the drives 71c and 72c to be mutually equal and when added also equal to ½N, then by appropriate regulation of the drive power it is possible to vary the conveying power and the direction of conveying, for example from upward to downward conveying or vice-versa, within wide limits according to requirements.

According to the invention, the unbalance mass 72a is so offset relative to the unbalance mass 72b that the resultant of the centrifugal forces produced by the two produce co-directional moments about the perpendicular axis 78 of the oscillating conveyor. The exciters 71a and 71b are driven at the same speeds. Their arrangement on the oscillating machine is such that after automatic synchronisation has occurred of all the rotating unbalanced masses 71a, 71b, 72a, and 72b resultant directional excitation forces are produced, which impart to the system helical, or in the case of unequal unbalanced masses 71b and 72b relative to 71a and 72a, elliptical or similar oscillator movements.

Figures 8A, 8B:
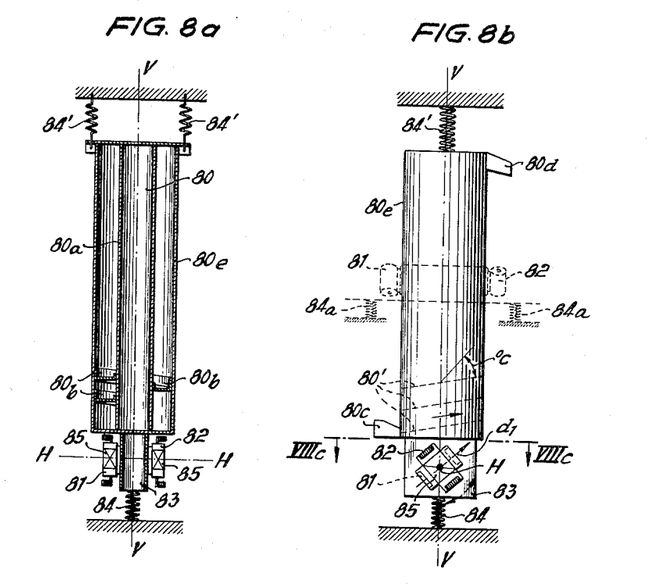
Figure 8C:
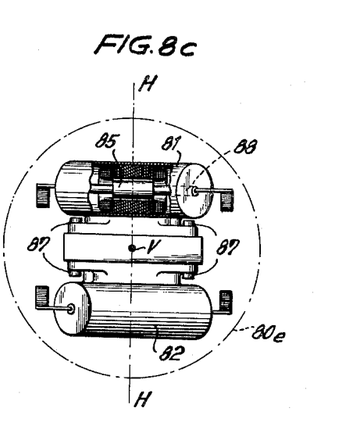
Figure 8D:
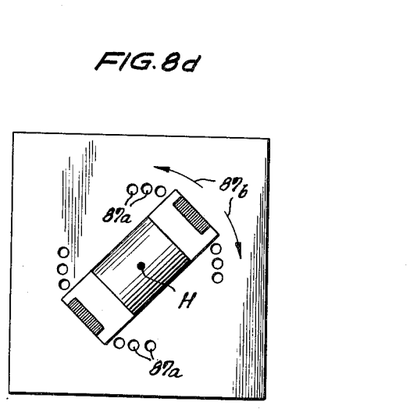

A third embodimenti s shown in FIGS 8a to 8d diagrammatically, in longitudinal section (FIG. 8a) and side elevation (FIG. 8b) and also on a larger scale in plan (FIG. 8c) and on a larger scale in elevation below the line VIIIc—VIIIc in FIG. 8b (FIG. 8c). The spiral conveyor 80 comprises for example the central frame 80a, the jacket tube 80 and the spiral material conveyor track 80b disposed between the frame and the jacket. It is either held to be freely oscillatable by springs 84' (top) and 84 (bottom) or supported laterally on a plurality of springs 84a (FIG. 8b). Instead of springs, vibration damping connectors may be used in known manner. At the bottom end of the central frame the centrifugal exciters 81 and 82 are disposed on the support 83 and are driven independently of one another and in the same direction with the same frequencies by so-called motors for independent electric drive. However, as shown by broken lines in FIG. 8b, the exciters could also be mounted at a suitable height on the frame 80a or on the jacket 80c. Reference numeral 80' in FIG. 8b denotes tangents to the trough base 80b, which is coiled in the form of a spiral. V—V is the vertical axis of the conveyor 80, while H—H indicates an axis preferably vertical to the main axis V—V. In the axis H—H the centrifugal exciters are disposed to be rockable (arrows 87b, FIG. 8d), and can be fastened there in any suitable position, for example by means of the screws 87 and the bores 87a (FIGS. 8c and 8d).

An essential feature of the conveyor shown in FIGS. 8a to 8d comprises the two single-axis 88 centrifugal exciters which in operation automatically form a directional exciter. They cause the oscillations of the machine 80 about the axis V—V and simultaneously the upward and downward oscillations in the direction of the axis V—V. All the points of the oscillating system not lying in the longitudinal axis V—V accordingly describe helical tracks. The advantage of the use of the above described centrifugal exciters consists in that the space required for and the weight of coupling members between the exciters is completely eliminated. Moreover, the spiral conveyor according to the invention has more favourable power conditions in comparison with known devices, owing to the lack of coupling members, primarily as a result of the elimination of power losses in the gears and in the oil bath in which the gears run.

The feature that the exciters are adjustable relative to the axes V—V and H—H of the spiral conveyor is accompanied, among others, by the following advantages:

(1) The exciters are to be adjustable in a direction (for example H—H) perpendicular to the main axis V—V, while, referred to the main axis, they remain diametrally opposite one another and at the same distance from the axis. With increasing distance from the main axis, the amplitude of the oscillating rotary motion passes through a maximum, in fact. In accordance with the required conditions, the most favourable exciter arrangement can be determined by calculation in accordance with the considerations of maxima and minima calculation.

(2) If the exciters are mounted to be rockable about the axis H—H, then, as indicated in FIG. 8b, the line of action of the exciter force $d_1$ forms with the tangent 80' at the coiled trough base, an acute angle $\alpha$, which experience shows should lie between 15 and 50°. This arrangement is convenient in the case of upward conveying of material on the spiral. The angle depends, among others, on the fineness of the material to be conveyed. When the angle $\alpha$ is increased, particularly above 90°, downward conveying occurs.

(3) If the exciters are displaced in suitable manner in the direction of the main axis V—V, any undesirable elastic deformations occurring, caused by bending, longitudinal, or rotational oscillations, can be reduced to a minimum.

The measures of the invention are preferably adopted in freely swinging conveyors having a vertical or steep axis and a trough wound as a coil, a spiral, or a ring or in any other way and serving in the majority of cases as conveyor trough. The trough can if desired be equipped with screening sections, while in addition to the effect of screening and classification it is also possible to carry out the vibration drying of moist material being conveyed.

Figure 9A:
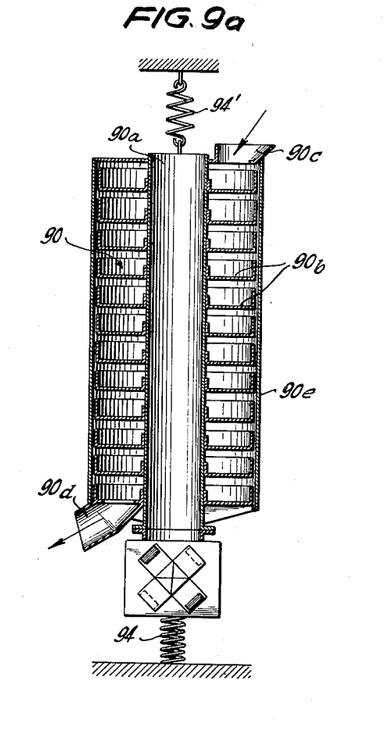
Figure 9B:
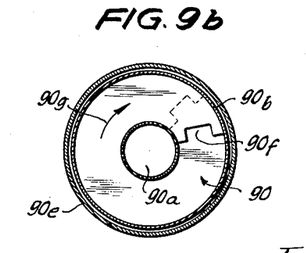

FIGS. 9a and 9b illustrate an annular reciprocating conveyor 90 in longitudinal and cross-section, with a number of annular troughs 90b, which are disposed in stages one above the other and which are fastened to a holding tube 90a and provided with jacketing 90e. The material, introduced at the top at 90c falls after rotating in each annular trough through a gap 90f on to the next following annular trough. On the lowest annular trough the outlet 90d for the material is provided. The annular reciprocating conveyor is held at top and bottom by springs 94 and 94' respectively so that it can swing freely.

The drive is the same as for the spiral reciprocating conveyor illustrated in FIGS. 8a to 8d, and therefore needs no further explanation. The material circulates in the example illustrated in the clockwise direction (arrow 90g). The construction described is particularly useful for intensive treatment of material by heat or for other chemo-technical processes.

Figure 10:
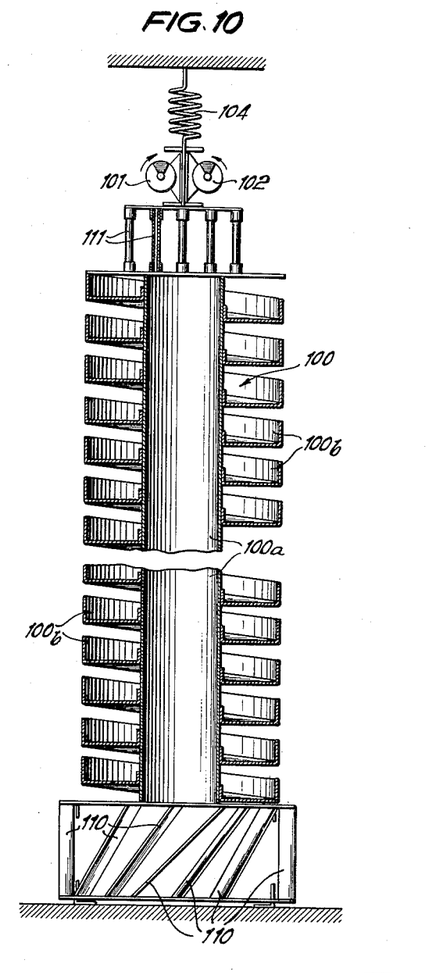

FIG. 10 shows a spiral conveyor 100 in longitudinal section, similar to that shown in FIGS. 8a to 8d. The conveyor 100 with the central tube 100a and the spiral path 100b fastened thereto rests in this example on inclined spring links 110 which are disposed along a circular path and which force the system, when excited, to perform a helical oscillating movement. Excitation is effected by two uncoupled centrifugal exciters 101 and 102 at the top end of the conveyor, which when rotated in opposite directions automatically form a directional exciter. This is achieved when the exciters are oscillatably connected to the oscillating system through elastic means, similarly to the exciters 51 and 52 shown in FIGS. 5a to 5d. In the example illustrated, a number of tubular springs 111 are provided for the purpose of serving as connections to the reciprocating conveyor 100. Springs having a tubular cross-section receive the torsional stresses occurring more favourably than leaf springs. In the case of particularly tall spiral towers, an additional suspension spring 104 may be advantageous for the purpose of stabilizing the oscillating system.

Changes may be made within the scope and spirit of the appended claims.

What is claimed is:

1. A vibrating conveyor for flowable solid material comprising chute means for conveying the material to be handled, and a system for imparting directed vibrations to said chute means so as to effect conveyance of said material therealong, said vibrating system comprising at least two unbalanced weight vibrators, individual motor drive means for each vibrator whereby said vibrators are driven in self-synchronizing rotation, means for disposing said unbalanced weight vibrators symmetrically with respect to said chute means so that the exciting vibrating forces respectively extend at least approximately through the total center of gravity of said chute means conveying said solid material, and means for selectively adjusting the ratio of power applied to said vibrators.

2. A vibrating conveyor having a vibrating system according to claim 1, wherein said unbalanced weight vibrators rotate in identical sense of rotation about axes extending along a line which substantially intersects the total center of gravity of said chute with said axes disposed near said center of gravity.

3. A vibrating conveyor having a vibrating system according to claim 1, wherein said unbalanced weight vibrators are disposed mutually considerably spaced from the total center of gravity of said chute.

4. A vibrating conveyor having a vibrating system according to claim 1, comprising a mounting for said unbalanced weight vibrators, means for resiliently disposing said mounting, and means for coupling said mounting with said chute to convey to said chute the vibrations imparted thereto by said vibrators.

5. A vibrating conveyor having a vibrating system according to claim 1, wherein said vibrating system comprises a plurality of pairs of unbalanced weight vibrators, a shaft for operating each pair of vibrators, said shafts extending mutually substantially in parallel relationship, and motor means for rotating each shaft individually.

6. A vibrating conveyor having a vibrating system according to claim 5, wherein said vibrating system comprises further pairs of unbalanced weight vibrators mutually coupled for common rotation by a shaft, a motor for driving said further vibrators in common, each of said further pairs of vibrators cooperatively disposed with respect to one of said first named pairs.

7. A vibrating conveyor having a vibrating system according to claim 1, comprising casing means for the respective unbalanced weight vibrators, the motor drive means for said vibrators being disposed within the respective casing means therefor.

8. A vibrating conveyor having a vibrating system according to claim 1, comprising means for mounting said vibrators for selective disposal in different angular positions with respect to said chute means.

References Cited in the file of this patent

UNITED STATES PATENTS

| | | |
|---|---|---|
| 1,280,269 | Miller | Oct. 1, 1918 |
| 2,076,195 | Fickel | Apr. 6, 1937 |
| 2,394,914 | Johnson | Feb. 12, 1946 |
| 2,531,706 | Signeul | Nov. 28, 1950 |
| 2,695,523 | Oswalt | Nov. 30, 1954 |
| 2,756,973 | Dostatni | July 31, 1956 |

FOREIGN PATENTS

| | | |
|---|---|---|
| 1,045,631 | France | July 1, 1953 |
| 1,060,207 | France | Nov. 18, 1953 |
| 299,278 | Switzerland | Aug. 16, 1954 |